United States Patent [19]
Leva

[11] Patent Number: 5,871,674
[45] Date of Patent: Feb. 16, 1999

[54] TOWER PACKING ELEMENT

[76] Inventor: Max Leva, 5600 Munhall Rd., Pittsburgh, Pa. 15217

[21] Appl. No.: 862,202

[22] Filed: May 23, 1997

[51] Int. Cl.⁶ ....................................................... B01F 3/04
[52] U.S. Cl. .............................. 261/94; 96/290; 202/158; 210/150; 261/DIG. 72
[58] Field of Search ........................ 55/233; 95/211.212; 202/158; 210/150.151; 261/94.98, DIG. 72

[56] References Cited

U.S. PATENT DOCUMENTS

| 2,615,832 | 10/1952 | Dixon | 261/DIG. 72 |
|---|---|---|---|
| 3,266,787 | 8/1966 | Eckert | 261/DIG. 72 |
| 4,203,934 | 5/1980 | Leva . | |
| 4,277,425 | 7/1981 | Leva . | |
| 4,310,475 | 1/1982 | Leva . | |
| 4,316,863 | 2/1982 | Leva | 261/DIG. 72 |
| 4,327,043 | 4/1982 | Leva | 261/DIG. 72 |
| 4,376,081 | 3/1983 | Leva | 261/DIG. 72 |
| 4,806,288 | 2/1989 | Nowosinski et al. | 261/DIG. 72 |
| 5,200,119 | 4/1993 | Leva | 261/DIG. 72 |

FOREIGN PATENT DOCUMENTS

| 473510 | 1/1976 | U.S.S.R. | 261/DIG. 72 |
|---|---|---|---|
| 665934 | 6/1979 | U.S.S.R. | 261/DIG. 72 |
| 1562402 | 3/1980 | United Kingdom | 261/DIG. 72 |
| 1602183 | 11/1981 | United Kingdom | 261/DIG. 72 |
| 2157189 | 10/1985 | United Kingdom | 261/DIG. 72 |

Primary Examiner—C. Scott Bushey
Attorney, Agent, or Firm—Reed Smith Shaw & McClay

[57] ABSTRACT

A tower packing element for randomly dumped beds includes a straight leg portion attached at one end to an arcuate portion. The length of the straight leg portion is substantially equal to the length of a cord that extends between the ends of the arcuate portion. The arcuate portion and the straight leg portion have at least one slot therein. A tongue depends from each slot and points away from the packing element.

17 Claims, 3 Drawing Sheets

TOWER PACKING ELEMENT

BACKGROUND OF THE INVENTION

1. Field of the Invention

This invention relates to a randomly dumped tower packing element for use in gas or vapor-liquid mass transfer towers and, more particularly, to a tower packing element that accommodates distillation, gas absorption, stripping, and other related operations.

2. Description of the Prior Art

Randomly dumped beds of packing elements are typically employed in towers with gas or vapor phase entering the packed bed from the bottom of the tower and rising upwardly for a vertical tower. Liquid is administered to the top of the packed bed and runs through the packed bed down to the bottom.

The packing elements which make up the packed bed function to provide a "skeleton" in the tower over the surface of which liquor is passed in the form of a thin film and preferably turbulent films. The skeleton is open to allow the gas or vapor to rise upwardly. As the vapor passes over the thin film of liquid present on the packing elements, mass transfer occurs between the gas or vapor phases and the liquid phase.

It is well known in the art that the efficiency and the rate of mass transfer per unit volume of the packed bed is dependent upon the surface area which the packing bed can provide.

Different configurations of packing elements are known to increase the surface area of the packing bed in a consistent manner. U.S. Pat. No. 4,376,081 discloses a randomly dumped tower packing element formed from strip material having the shape of a two dimensional continuously progressing curve (e.g. a sine or cosine curve) which is rotated between 10° and 180° to form a partial ring. The packing element configuration provides a longitudinal curvature as a result of its rotation, but the resulting shape also displays the characteristic curve of the continuously progressing curve itself. The packing element includes slots with tongues depending from the slots to provide more accessibility to the available surface area. The tongues point in any direction and from any portion of the surface.

Another important feature in the efficiency of tower packing elements is the extent to which their surfaces come into direct contact with each other. Direct contact between elements provides convenient flow paths along which the descending liquid can pass, instead of falling all the way through the packed bed.

U.S. Pat. No. 4,327,043 discloses randomly dumped tower packing elements formed of strip material having an open-ended bent configuration made up of three interconnected curved zones. An intermediate, concave curved portion is flanked on either side by oppositely curved convex end portions. Each of these portions has slots formed therein and tongues which depend from each slot. The tongues all point toward the inside of the intermediate curved portion. This unsymmetrical configuration provides a highly randomized packed bed which enhances internal liquid distribution and mass transfer performance.

U.S. Pat. No. 5,200,119 discloses a packing element formed of at least two substantially straight legs tangentially attached to the ends of an arcuately bent surface. The straight leg portions of the element contain slots. Depending from these slots are tongues which project transversely away from the surface of the element. The arcuately bent surface does not contain slots or tongues in order to maximize the beneficial turbulence obtained when the fluid contacts the smooth surface of the bend.

The prior art packing elements suffer a number of deficiencies mostly due to the lack of consistent uniformity in which the elements form the packed bed and the way in which these elements settle over time. The geometric shape of the elements not only effects the available surface area and the direct contact each element has with adjoining elements, but also the stability of the packed bed and the consistency with which the desired characteristics are obtained. Due to non-accessibility of certain regions of packed beds to gas-liquid flows, fluid maldistributions result. Thus certain portions of the packing are rendered less accessible to efficient liquid gas contact than other portions with the result that the overall mass transfer efficiency of the packing is impaired.

While a number of geometric configurations have been proposed for increasing the efficiency of tower packing elements, there is a need for a randomly dumped packing element having a geometric configuration which increases the statistical uniformity of the randomly dumped layers. The tower packing element should have a substantially increased surface area available for liquid film formation and enhancing the probability of direct contact between adjacent packing elements in the tower.

SUMMARY OF THE INVENTION

In accordance with the present invention there is provided a randomly dumped tower packing element that includes a strip base having a selected surface area. The strip base is shaped to define an arcuate portion and a substantially straight leg portion. The arcuate portion has a connection point and a free end. The straight leg portion is connected to the connection point. The arcuate portion is defined by an angle. The angle is formed by the intersection of normals to lines tangent to the arcuate portion at the connection point and the free end, respectively. The arcuate portion and the straight leg portion include a slot and a depending tongue.

Further in accordance with the present invention there is provided a randomly dumped tower packing element that includes a strip base having a selected surface area. The strip base is shaped to define an arcuate portion and a straight leg portion. The arcuate bend has a connection point and a free end. The straight leg portion is connected to the connection point. The straight leg portion has a length equal in a range between about one half to one and a half the length of a cord drawn between the connection point and the free end of the arcuate portion. The arcuate portion is defined by an angle. The angle is formed by the intersection of normals to lines tangent to the arcuate portion at the connection point and the free end, respectively. The arcuate portion and the straight leg portion include a slot and a depending tongue.

These and other objects of the present invention will be more completely disclosed and described in the following specification, the accompanying drawings, and the appended claims.

DESCRIPTION OF THE PREFERRED EMBODIMENTS

Figure 1:
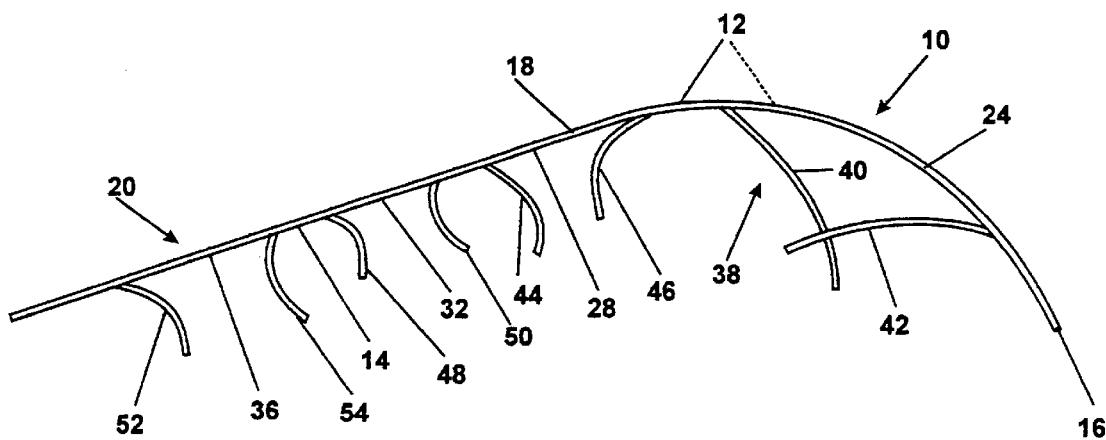
FIG. 1 is a view in side elevation of the tower packing element of the present invention, illustrating a plurality of slots and tongues depending from a body portion having an arcuate portion and a straight leg portion.
Figure 2:
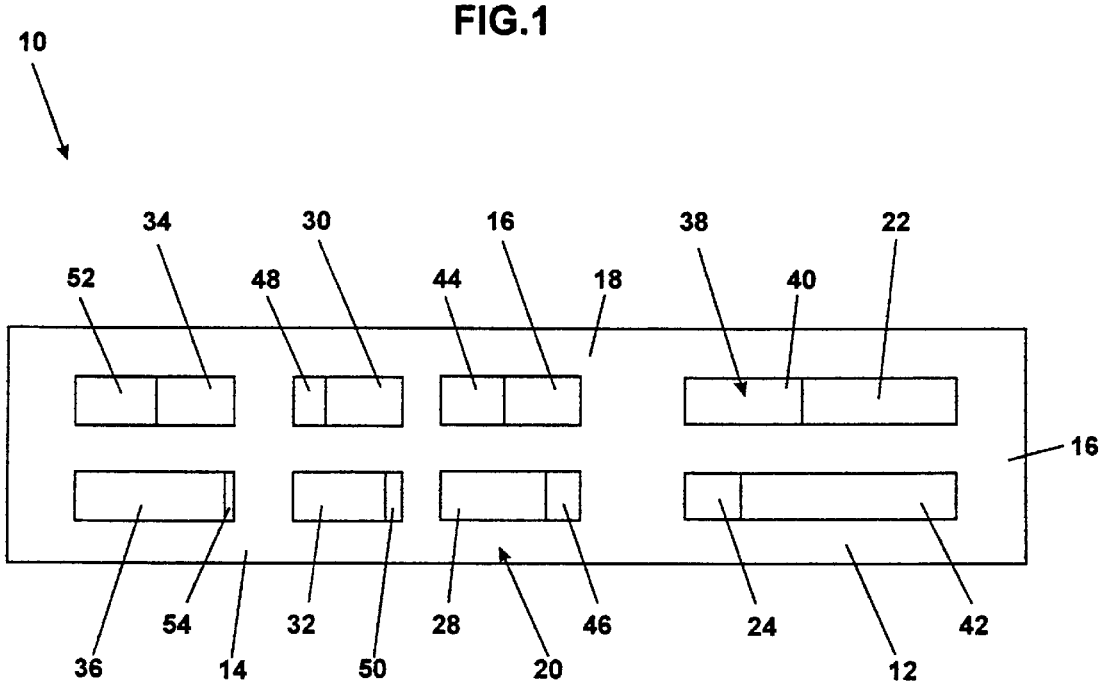
FIG. 2 is a plan view of the packing element shown in FIG. 1, illustrating two rows of slots and depending tongues.

Referring to the drawings and particularly FIGS. 1 and 2, there is illustrated a tower packing element generally designated by the numeral 10. Packing element 10 may be formed of a variety of strip materials including, but not limited to, metal, plastic and ceramic. The details regarding the differences in forming the packing element 10 of different strip materials are beyond the scope of the present invention and are disclosed in detail in U.S. Pat. No. 5,200,119 which is incorporated herein by reference.

Packing element 10 is formed in the combination of an arcuate portion 12 and a straight leg portion 14. Arcuate portion 12 has been chosen by example to be in the shape of a parabola having a free end 16 and a connection point 18. Straight leg portion 14 is tangentially attached to arcuate portion 12 at connection point 18. This wide open shape of packing element 10 provides ready accessibility to liquids, gases, and contact with neighboring packing elements. Further the shape of the packing element 10 provides an optimum number of packing element pieces per cubic foot of mass transfer tower, thereby optimizing performance.

Figure 4:
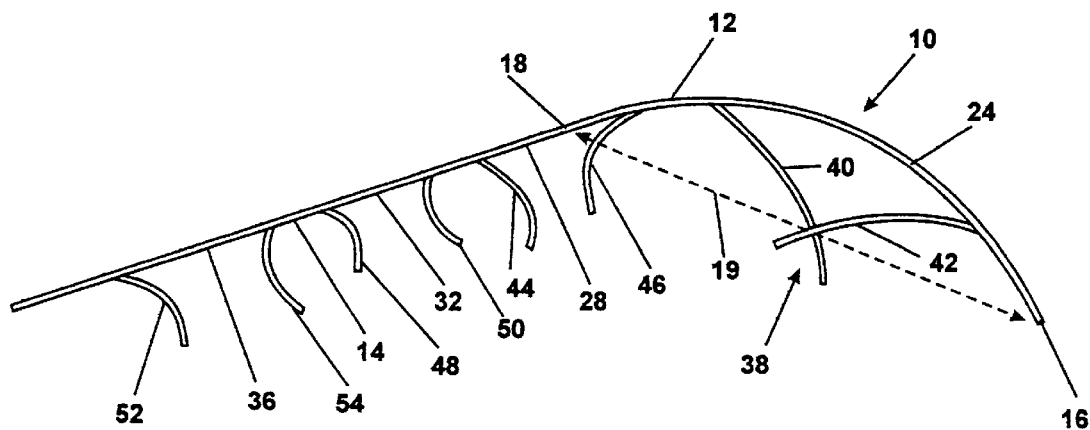
FIG. 4 is another digrammatic view of the tower packing element, illustrating the length of a cord of the arcuate portion.

Referring to FIG. 4, there is diagrammatically illustrated the enhanced open features of the shape of packing element 10. The length of straight leg portion 14 shown in FIG. 4 is substantially equal to the length of cord 19. However, it should be understood that in accordance with the present invention the length of the leg portion may vary in a range between about one half to one and a half times the length of the cord 19. Cord 19 is an imaginary line formed between connection point 18 and free end 16 of the arcuate portion 12.

As illustrated in FIGS. 1 and 2, a plurality of slots generally designated by the numeral 20 are provided in packing element 10 for promoting uniform flow of liquids and gases through the packing element. Slots 22 and 24 are located in arcuate portion 12, and slots 26, 28, 30, 32, 34 and 36 are located in straight leg portion 14. Slots 22, 26, 30 and 34 are of different lengths.

A plurality of tongues generally designated by the numeral 38 depend from slots 20 of the packing element 10 to increase and enhance the effectiveness of the surface area. This construction provides ready accessibility to liquid-gas traffic passing through the packed bed as well as to promote increased direct contact between adjacent packing elements. Tongues 40 and 42 depend from the confines of slots 22 and 24, respectively, in the arcuate portion 12. Tongues 44, 46, 48, 50, 52 and 54 depend from the confines of slots 26, 28, 30, 32, 34 and 36, respectively, in the straight leg portion 14.

The lengths of tongues 38 shown in FIG. 1 are substantially equal to the lengths of the respective slots 20 from which they depend. In other embodiments, the tongues 38 are longer or shorter than the slots 20. Additionally, the tongues can be straight or curved or a combination of a straight section and a curved section. Although, tongues 38 are shown as depending into the center of packing element 10, it should be understood that in accordance with the present invention selected tongues may extend upwardly away from the straight leg portion 14.

Figure 3:
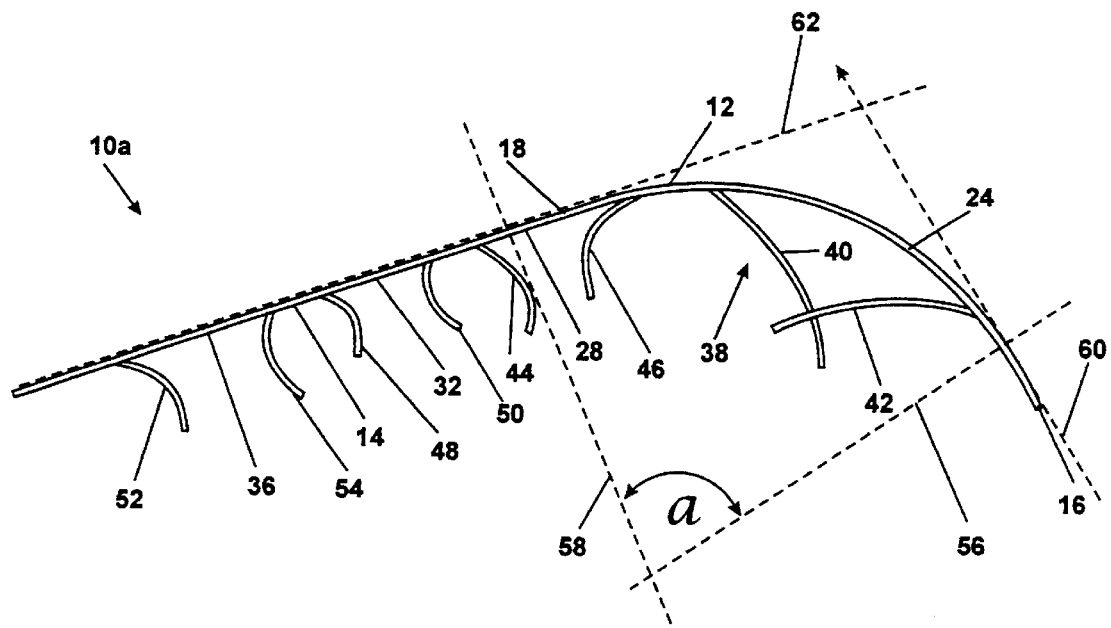
FIG. 3 is a diagrammatic view of the tower packing element shown in FIG. 1, illustrating an angle alpha defined by the intersection.

Referring to FIG. 3, there is illustrated angle a formed by the intersection of imaginary normal lines 56 and 58. Normal line 56 is perpendicular to tangent line 60. Line 60 is a line tangent to arcuate portion 12 at free end 16. Likewise, normal line 58 is perpendicular to tangent line 62. Line 62 is tangent to arcuate portion 12 at connection point 18. The angle a is a critical parameter in the performance of the packing element to enhance the mass transfer properties of the packing element 10. Preferably the angle a is in the range between about 70° to 90° and most preferably in the range between about 75° to 85°.

The operation of the above described packing element 10 of the present invention constitutes a substantial improvement over known tongue-bearing packing elements, as for example slotted ring packings and variations thereof, some of which embody various diameter-height aspect ratios. With the prior art slotted rings, the tongues are confined to the inside of the rings and do not make significant contact with the neighboring pieces. The undesirable feature of positioning the tongues inside the slotted rings adversely affects the pressure drop and mass transfer. With the novel open ended randomly dumped packing elements 10 of the present invention, these adverse effects are overcome.

As illustrated in FIG. 2, the packing element 10 has two distinct rows of slots 20 and tongues 38. The number of rows is selective and is based on the overall size of the packing element 10. Preferably, the width of slots 20, for the largest to the smallest embodiment of the packing elements 10, is substantially within the range of 1.00 to 0.10 inch.

To ensure that the packing element 10 has both sufficient strength to withstand the long term pressure built up in a mass transfer tower, as well as, sufficient accessibility to liquid-gas flow, the surface area of the slots relative to the total surface area of the packing element 10 is preferably within the range between about 15 to 90 percent and most preferably within the range between 25 to 75 percent.

Figure 5:
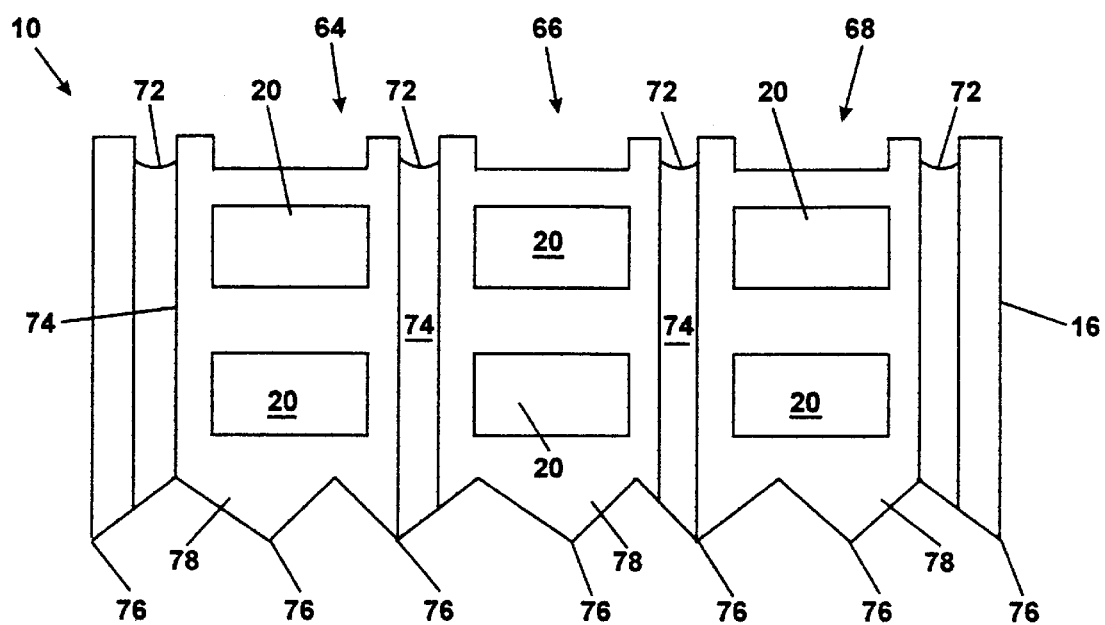
FIG. 5 is a plan view similar to FIG. 2, illustrating a plurality of slots, stiffening grooves, and drip-points.

Referring to FIG. 5, in order to provide added strength to the packing element 10, there is illustrated stiffening grooves 72 in the surfaces 74 separating rows 64, 66, and 68 of slots 20. The number of stiffening grooves 72 is dependent on the size and application of the packing element 10.

In order to promote the quality of irrigation by the liquid and thereby increase the mass transfer efficiency, a plurality of drip points 76 are provided on packing element 10, as shown in FIG. 5. One method of forming drip points 76 is to serrate terminal free ends 78 of packing element 10, as illustrated in FIG. 5.

According to the provisions of the patent statutes, I have explained the principle, preferred construction, and mode of operation of my invention and have illustrated and described what I now consider to represent its best embodiments. However, it should be understood that, within the scope of the appended claims, the invention may be practiced otherwise than as specifically illustrated and described.

I claim:

1. A randomly dumped tower packing element comprising, a strip base having a selected surface area, said strip base being shaped to define an arcuate portion and a substantially straight leg portion, said arcuate portion having a connection point and a free end, said straight leg portion being connected to said connection point, said arcuate portion being defined by an angle, said angle being formed by the intersection of normals to lines tangent to said arcuate portion at said connection point and free end, respectively, and said arcuate portion and said straight leg including a slot and a depending tongue.

2. A randomly dumped tower packing element set forth in claim 1 which includes, said angle of said arcuate portion being in a range between about 70° and 90°.

3. A randomly dumped tower packing element set forth in claim 1 which includes, said angle of said arcuate portion being in a range between about 75° and 85°.

4. A randomly dumped tower packing element set forth in claim 1 which includes, said tongues being substantially the same length as said slots.

5. A randomly dumped tower packing element set forth in claim 1 which includes, said tongues being a different length than said slots.

6. A randomly dumped tower packing element set forth in claim 1 which includes, said slots being formed in rows, and stiffening grooves formed in said strip material between said rows to strengthen said packing element.

7. A randomly dumped tower packing element set forth in claim 1 which includes, said strip material having drip points to promote irrigation of liquid on said packing element.

8. A randomly dumped tower packing element comprising, a strip base having a selected surface area, said strip base being shaped to define an arcuate portion and a substantially straight leg portion, said arcuate portion having a connection point and a free end, said straight leg portion being connected to said connection point, said straight leg portion having a length equal in a range between about one half to one and a half the length of a cord drawn between said connection point and said free end of said arcuate portion, said arcuate portion being defined by an angle, said angle being formed by the intersection of normals to lines tangent to said arcuate portion at said connection point and free end, respectively, and said arcuate portion and said straight leg portion including a slot and a depending tongue.

9. A randomly dumped tower packing element set forth in claim 8 which includes, said angle of said arcuate portion being in a range between about 70° to 90°.

10. A randomly dumped tower packing element set forth in claim 8 which includes, said angle of said arcuate portion being in a range between about 75° to 85°.

11. A randomly dumped tower packing element set forth in claim 8 which includes, said tongues being substantially the same length as said slots.

12. A randomly dumped tower packing element set forth in claim 8 which includes, said tongues being a different length than said slots.

13. A randomly dumped tower packing element set forth in claim 8 which includes, said slots having a width substantially in a range between about 0.10 and 1.00 inch.

14. A randomly dumped tower packing element set forth in claim 8 which includes, said slots having a relative surface area in relation to the surface area of the strip material substantially in the range between about 15% and 90%.

15. A randomly dumped tower packing element set forth in claim 8 which includes, said slots having a relative surface area in relation to the surface area of the strip material substantially in the range between about 25% and 75%.

16. A randomly dumped tower packing element set forth in claim 8 which includes, said slots being formed in rows, and stiffening grooves formed in said strip material between said rows to strengthen said packing element.

17. A randomly dumped tower packing element set forth in claim 8 which includes, said strip material having drip points to promote irrigation of liquid on said packing element.

* * * * *